(12) United States Patent
Bae

(10) Patent No.: US 8,804,556 B2
(45) Date of Patent: Aug. 12, 2014

(54) SYSTEM AND METHOD FOR HANDOVER IN WIRELESS COMMUNICATION SYSTEM

(75) Inventor: Byoung-Jae Bae, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 114 days.

(21) Appl. No.: 13/331,445

(22) Filed: Dec. 20, 2011

(65) Prior Publication Data

US 2012/0155309 A1    Jun. 21, 2012

(30) Foreign Application Priority Data

Dec. 21, 2010    (KR) ........................ 10-2010-0131174

(51) Int. Cl.
*H04L 1/00*     (2006.01)
*H04W 76/04*    (2009.01)
*H04W 24/10*    (2009.01)

(52) U.S. Cl.
CPC ............ *H04W 76/048* (2013.01); *H04W 24/10* (2013.01)
USPC ........... 370/252; 370/241; 370/311; 370/329; 455/67.11; 455/434; 455/442

(58) Field of Classification Search
None
See application file for complete search history.

(56) References Cited

U.S. PATENT DOCUMENTS

| | | | |
|---|---|---|---|
| 7,957,360 B2* | 6/2011 | Suzuki et al. | 370/341 |
| 7,966,017 B2* | 6/2011 | Kim et al. | 455/436 |
| 2009/0092056 A1* | 4/2009 | Kitazoe | 370/252 |
| 2010/0014429 A1* | 1/2010 | Kim et al. | 370/241 |
| 2010/0048209 A1* | 2/2010 | Aoyama et al. | 455/435.2 |
| 2010/0142485 A1* | 6/2010 | Lee et al. | 370/331 |
| 2010/0303039 A1* | 12/2010 | Zhang et al. | 370/331 |

* cited by examiner

*Primary Examiner* — Ian N Moore
*Assistant Examiner* — Latresa McCallum
(74) *Attorney, Agent, or Firm* — The Farrell Law Firm, P.C.

(57) ABSTRACT

A system and a method for handover of a terminal in a wireless communication system are provided. The method includes transmitting, by a serving BS, measurement control information and DRX control information to a terminal; measuring, by the terminal, a channel, based on the measurement control information; operating, by the terminal, in connected DRX, based on the DRX control information; reporting, by the terminal, channel measurement information to the serving BS; determining, by the serving BS, the handover of the terminal based on the channel measurement information provided from the terminal; resetting, by the serving BS, the DRX control information of the terminal; transmitting, by the serving BS, the reset DRX control information to the terminal; operating, by the terminal, in the connected DRX, based on the reset DRX control information provided from the serving BS; and transmitting, by the serving BS, handover indication information to the terminal.

10 Claims, 8 Drawing Sheets

SYSTEM AND METHOD FOR HANDOVER IN WIRELESS COMMUNICATION SYSTEM

PRIORITY

The present application claims priority under 35 U.S.C. §119(a) to Korean patent application Serial No. 10-2010-0131174, which was filed in the Korean Intellectual Property Office on Dec. 21, 2010, the entire disclosure of which is hereby incorporated by reference.

BACKGROUND OF THE INVENTION

1. Field of the Invention

The present invention relates generally to a system and a method for handover in a wireless communication system.

2. Description of the Related Art

To reduce power consumption of a terminal, a wireless communication system supports Discontinuous Reception (DRX). Generally, DRX is classified as idle DRX and connected DRX, according to the state of a Radio Resource Control (RRC) layer.

When the terminal operates in idle DRX, it operates in an RRC standby state. Accordingly, the terminal monitors a Physical Downlink Control CHannel (PDCCH) in a paging interval determined by a base station, and measures a channel to retain mobility. At this time, the network does not include RRC context information of the terminal, and there is no RRC connection between the terminal and the network.

When the terminal operates in connected DRX, it operates in an RRC connection state. Accordingly, the terminal is activated based on configuration parameters for the connected DRX operation provided from the base station using an RRC message. For example, when connected DRX is activated, the terminal monitors the PDCCH during an On Duration time, based on the configuration parameters provided from the base station.

FIG. 1 illustrates conventional connected DRX.

Referring to FIG. 1, when connected DRX is activated, the terminal is activated per DRX cycle 100 to monitor the PDCCH of the base station during the On Duration time 110. The terminal reduces its power consumption in the remaining time 120 in the DRX cycle 100. Basically, the terminal operates in an inactive mode during the remaining time 120.

When the terminal hands over in the wireless communication system, the terminal transmits channel measurement information to the base station. The terminal then hands over to a target base station, based on handover indication information provided from the base station. For example, when the terminal operates in connected DRX, it transmits the channel measurement information to the base station during the On Duration time 110. During the remaining time 120, before the terminal receives the handover indication information from the base station, the terminal cannot receive the handover indication information until an On Duration time 110 of a next DRX cycle 100 arrives. Further, when the DRX cycle 100 is lengthened, the channel state of the serving base station and the target base station changes according to the mobility of the terminal. Consequently, the handover can fail.

SUMMARY OF THE INVENTION

The present invention is designed to address at least the above-mentioned problems and/or disadvantages and to provide at least the advantages described below.

Accordingly, an aspect of the present invention to provide a system and a method for handover in a wireless communication system.

Another aspect of the present invention is to provide a system and a method for reducing handover delay in a wireless communication system.

Another aspect of the present invention is to provide a system and a method for handover of a terminal operating in DRX in a wireless communication system.

Another aspect of the present invention is to provide a system and a method for reducing handover delay of a terminal operating in connected DRX in a wireless communication system.

In accordance with an aspect of the present invention, a method for handover of a terminal in a wireless communication system is provided. The method includes transmitting, by a serving base station, measurement control information and Discontinuous Reception (DRX) control information to the terminal; measuring, by the terminal, a channel, based on the measurement control information; operating, by the terminal, in connected DRX, based on the DRX control information; reporting, by the terminal, channel measurement information to the serving base station; determining, by the serving base station, the handover of the terminal based on the channel measurement information provided from the terminal; resetting, by the serving base station, the DRX control information of the terminal; transmitting, by the serving base station, the reset DRX control information to the terminal; operating, by the terminal, in the connected DRX, based on the reset DRX control information provided from the serving base station; and transmitting, by the serving base station, handover indication information to the terminal.

In accordance with another aspect of the present invention, a wireless communication system for handover of a terminal is provided. The wireless communication system includes a serving base station for transmitting measurement control information and Discontinuous Reception (DRX) control information; and a terminal for measuring a channel according to the measurement control information received from the serving base station, operating in connected DRX according to the DRX control information received from the serving base station, and reporting channel measurement information to the serving base station. The serving base station determines the handover of the terminal based on the channel measurement information provided from the terminal, resets the DRX control information of the terminal, and transmits the reset DRX control information to the terminal. The terminal operates in the connected DRX according to the reset DRX control information provided from the serving base station. The serving base station transmits handover indication information to the terminal.

In accordance with another aspect of the present invention, a method for handover of a terminal in a wireless communication system is provided. The method includes transmitting, by a serving base station, measurement control information and Discontinuous Reception (DRX) control information to the terminal; measuring, by the terminal, a channel according to the measurement control information; operating, by the terminal, in connected DRX according to the DRX control information; reporting, by the terminal, channel measurement information to the serving base station; confirming, by the terminal, the handover according to the channel measurement information; deactivating, by the terminal, the connected DRX; determining, by the serving base station, the handover of the terminal according to the channel measurement information provided from the terminal; and transmitting, by the serving base station, handover indication information to the terminal.

In accordance with another aspect of the present invention, a wireless communication system for handover of a terminal is provided. The method includes a serving base station for transmitting measurement control information and Discontinuous Reception (DRX) control information; and a terminal for measuring a channel according to the measurement control information received from the serving base station, operating in a connected DRX according to the DRX control information received from the serving base station, and reporting channel measurement information to the serving base station. The terminal confirms the handover according to the channel measurement information, and deactivates the connected DRX. The serving base station determines the handover of the terminal according to the channel measurement information provided from the terminal, and transmits handover indication information to the terminal.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

It is to be understood that singular forms "a," "an," and "the" include plural referents unless the context clearly dictates otherwise. Thus, for example, reference to "a component surface" includes reference to one or more of such surfaces.

The various embodiments of the present invention described herein provide techniques for providing handover of a terminal in a wireless communication system. In particular, an embodiment of the present invention provides a technique for providing the handover in connected DRX in a wireless communication system.

Figure 1:
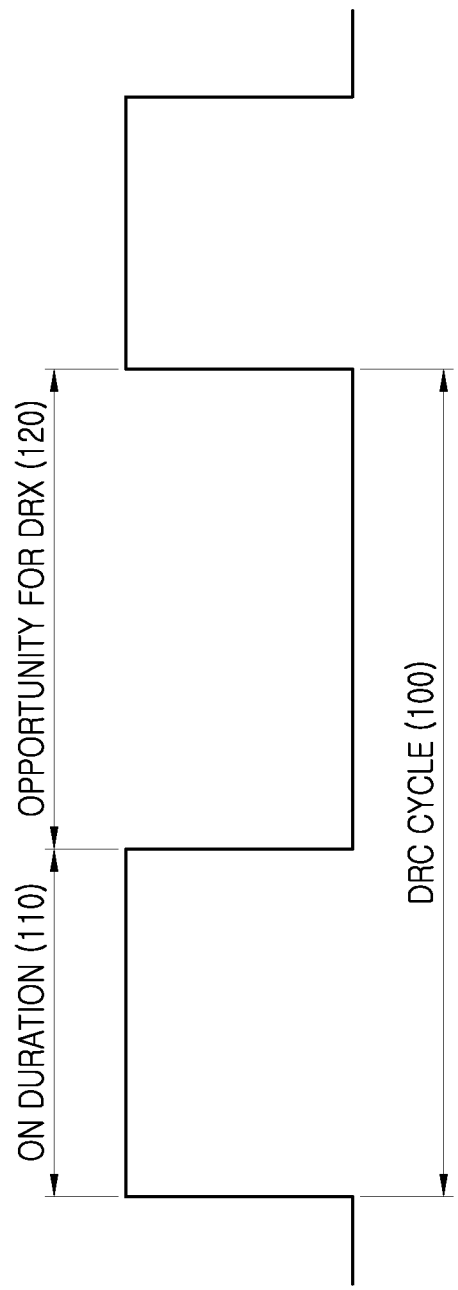
FIG. 1 illustrates conventional connected DRX.
Figure 2:
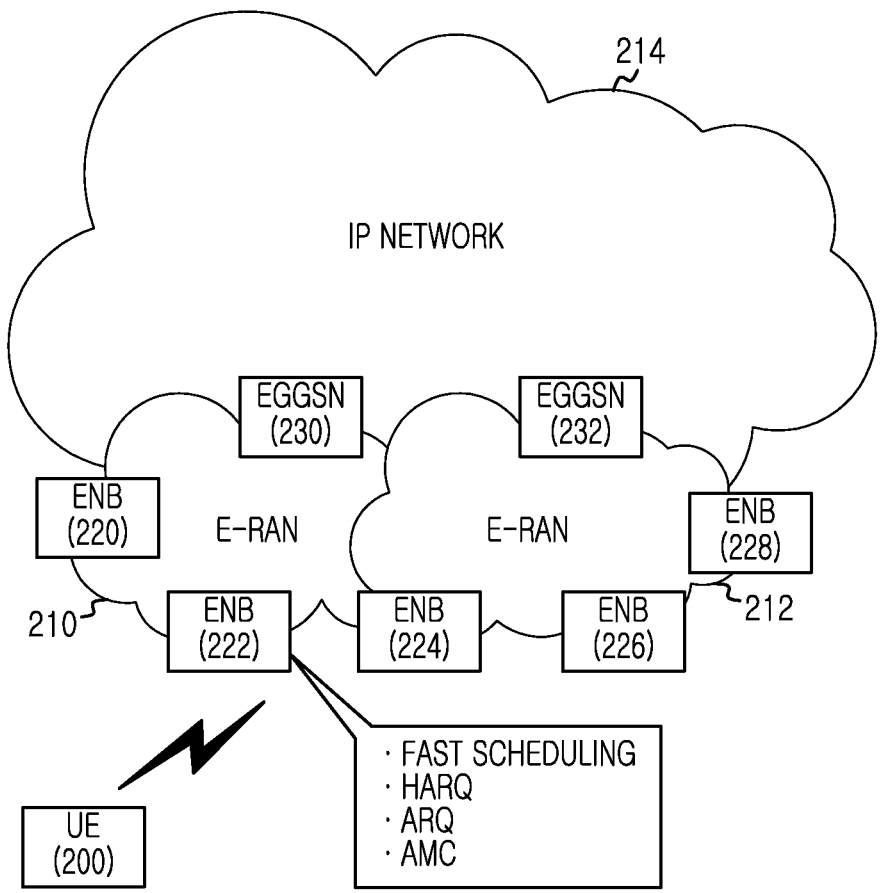
FIG. 2 illustrates a wireless communication system according to an embodiment of the present invention.

FIG. 2 illustrates a wireless communication system according to an embodiment of the present invention. Although FIG. 2 illustrates a wireless communication system based on the Long Term Evolution (LTE) standard, the embodiments of the present invention are not limited thereto.

Referring to FIG. 2, the wireless communication system includes Evolved-Radio Access Networks (E-RANs) 210 and 212. The E-RANs 210 and 212 include Base Stations (BSs) 220 through 228 and access gateways 230 and 232. Herein, the BSs include Evolved Node Bs (ENBs), and the access gateways 230 and 232 include Enhanced Gateway General Packet Radio Service (GPRS) Support Nodes (EGGSNs).

A User Equipment (UE) 200 accesses an Internet Protocol (IP) network via the E-RAN 210 or 212. The BSs 220 through 228 transmit and receive signals to and from the UE 200 over a radio channel. The BSs 220 through 228 aggregate and schedule operation state information of the UE 200.

In a wireless communication system as illustrated in FIG. 2, the UE supports DRX to reduce its power consumption. As described above, DRX is classified into idle DRX and connected DRX, based on the state of an RRC layer.

When the UE provides connected DRX, the wireless communication system sets a short interval of the UE for monitoring a PDCCH so as to reduce handover delay and handover failure according to a connected DRX operation of the UE. For example, for the wireless communication system to shorten the interval of the UE for monitoring the PDCCH, the UE deactivates connected DRX, as will be described in more detail below.

For example, to shorten the interval of the UE for monitoring the PDCCH, the wireless communication system can set a short DRX cycle of the UE, can set a short DRX, can lengthen a driving time of a short DRX cycle timer, or can extend a DRX deactivation time.

Hereafter, it is assumed that a serving BS resets DRX control information so that the UE providing the DRX can receive handover indication information. Herein, the DRX control information includes at least one of DRX cycle change information, short DRX setting information, DRX short cycle time change information, and DRX deactivation time change information.

Figure 3:
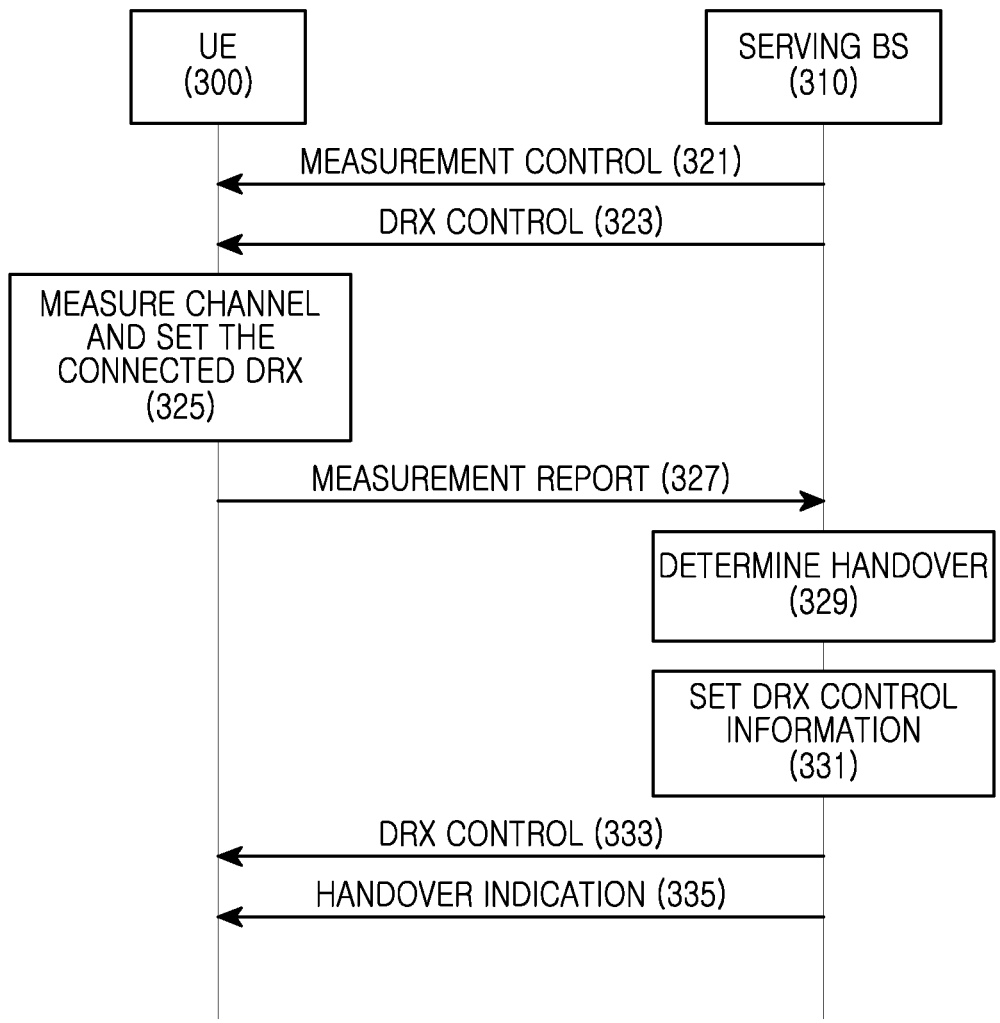
FIG. 3 is a signal flow diagram illustrating a handover method in a wireless communication system according to an embodiment of the present invention.

FIG. 3 is a signal flow diagram illustrating a handover method in a wireless communication system according to an embodiment of the present invention.

Referring to FIG. 3, a serving BS 310 transmits measurement control information to a UE 300 in step 321, e.g., using an RRC connection reconfiguration message.

The serving BS 310 transmits DRX control information to the UE 300 in step 323. Herein, the DRX control information includes the DRX deactivation time information of the UE 300 such that the UE 300 does not transition to an inactive mode until the UE 300 receives the DRX control information from the serving BS 310, after the UE 300 reports the channel measurement information to the serving BS 310.

In step 325, the UE 300 measures the channel according to the measurement control information provided from the serving BS 310 and operates in connected DRX according to the DRX control information provided from the serving BS 310.

When satisfying a channel report condition of the channel measurement, the UE 300 then reports the channel measurement information to the serving BS 310 in step 327.

In step 329, the serving BS 310 determines whether to hand over the UE 300 based on the channel measurement information provided from the UE 300.

When determining to hand over the UE 300, the serving BS 310 resets the DRX control information of the UE 300 in step 331. That is, the serving BS 310 resets the DRX parameters of the UE 300 to shorten the interval of the UE 300 for monitoring the PDCCH during the DRX deactivation time.

In step 333, the serving BS 310 transmits the DRX control information to the UE 300, e.g., using the RRC connection reconfiguration message. Therefore, based on the DRX control information received from the serving BS 310, the UE 300 monitors the PDCCH at shorter intervals than before.

In step 335, when the handover indication message is prepared, the serving BS 310 sends the handover indication message to the UE 300 by utilizing a resource for the UE 300 to monitor the PDCCH.

In FIG. 3, the serving BS 310 transmits the measurement control information in step 321 and then transmits the DRX control information in step 323.

Alternatively, the serving BS 310 may transmit the measurement control information and the DRX control information together, e.g., using a single RRC connection reconfiguration message.

Alternatively, the serving BS 310 may first transmit the DRX control information and then transmit the measurement control information.

Figure 4:
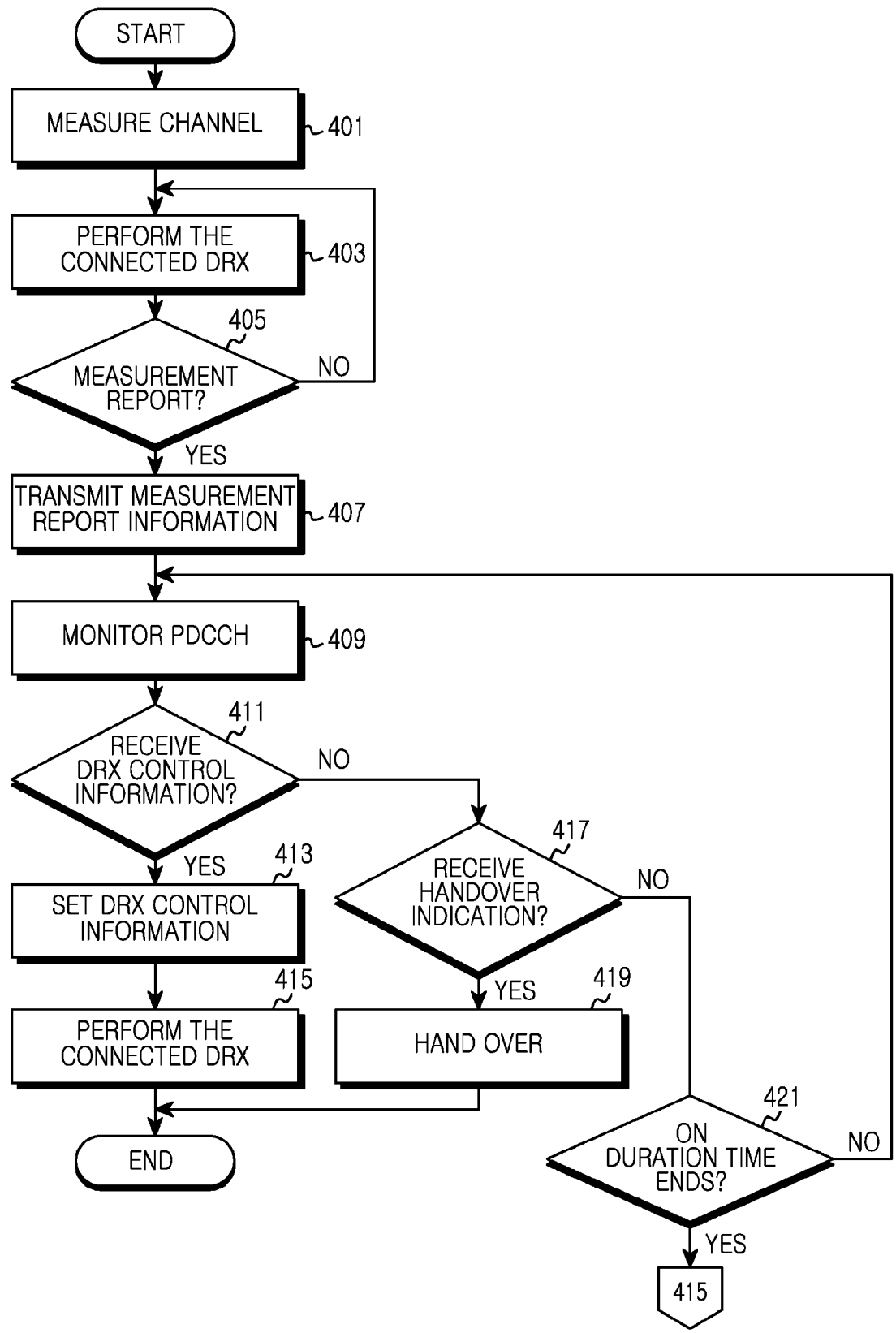
FIG. 4 is a flow chart illustrating operations of a UE for handover in a wireless communication system according to an embodiment of the present invention.

FIG. 4 is a flow chart illustrating operations of a UE for handover in a wireless communication system according to an embodiment of the present invention. In the description of FIG. 4, it is assumed that a serving BS transmits measurement control information in step 321 and then transmits DRX control information in step 323, as illustrated in FIG. 3.

Referring to FIG. 4, in step 401, the UE measures a channel according to measurement control information received from the serving BS. For example, the measurement control information is received in an RRC connection reconfiguration message.

In step 403, the UE operates in connected DRX according to DRX control information received from the serving BS. For example, the DRX control information is received in the RRC connection reconfiguration message.

In step 405, the UE determines whether a channel report event occurs. That is, the UE determines whether the channel report condition of the channel measurement is satisfied.

When the channel report event occurs, the UE reports the channel measurement information to the serving BS in step 407.

In step 409, the UE monitors the PDCCH. For example, the UE checks the DRX deactivation period based on the DRX deactivation time of the DRX control information received from the BS in step 403, and then monitors the PDCCH during the DRX deactivation period. That is, when the DRX of the UE is deactivated, the UE operates in an active mode and monitors the PDCCH.

In step 411, the UE determines whether DRX control information is received. For example, the UE determines whether an RRC connection reconfiguration message including the DRX control information is received while monitoring the PDCCH.

In step 413, upon receiving the DRX control information, the UE resets the DRX according to the DRX control information received from the BS.

In step 415, the UE operates in connected DRX according to the reset DRX. At this time, the UE monitors the PDCCH according to the reset DRX at shorter intervals than before.

When the UE does not receive the DRX control information in step 411, the UE determines whether handover indication information is received in step 417.

Upon receiving the handover indication information from the BS, the UE hands over to the target BS in step 419.

However, when the UE does not receive the handover indication information in step 417, the UE determines whether an On Duration time of the UE ends in step 421. For example, the UE determines whether the DRX is activated according to the DRX deactivation time of the DRX control information received from the BS and the UE deactivation period arrives.

When the On Duration time of the UE does not end in step 421, the UE monitors the PDCCH again in step 409.

When the On Duration time of the UE ends in step 421, the UE performs the connected DRX according to the previous DRX in step 415. For example, the UE performs the connected DRX according to the DRX control information received from the BS in step 403.

Figure 5:
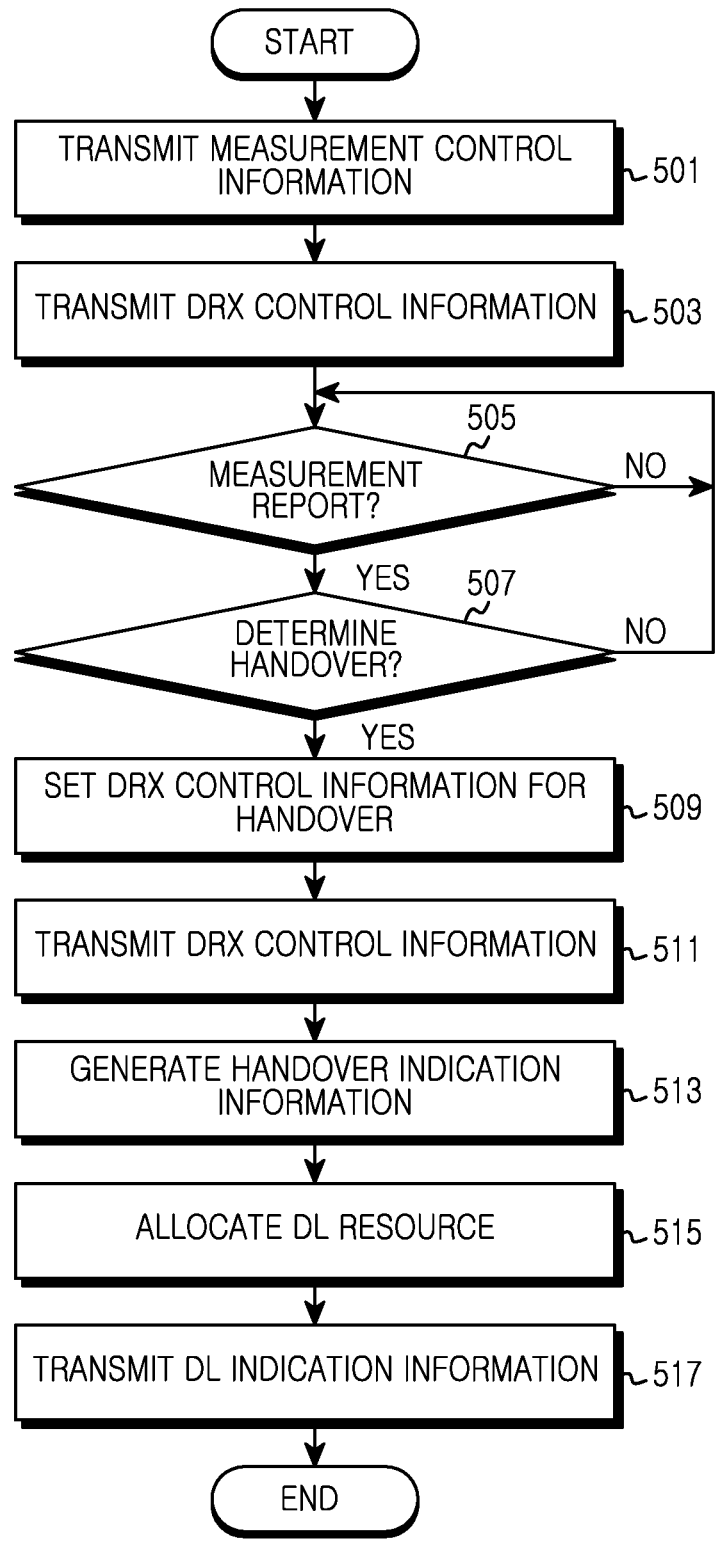
FIG. 5 is a flow chart illustrating operations of a BS for handover in a wireless communication system according to an embodiment of the present invention.

FIG. 5 is a flow chart illustrating operations of a BS for handover in a wireless communication system according to an embodiment of the present invention. In FIG. 5, it is assumed that a serving BS transmits measurement control information in step 321 and then transmits the DRX control information in step 323, as illustrated in FIG. 3.

Referring to FIG. 5, in step 501, the BS transmits the measurement control information to the UE so that the UE can measure a channel. For example, the BS transmits the measurement control information to the UE using an RRC connection reconfiguration message.

In step 503, the BS transmits the DRX control information to the UE so that the UE can operate in connected DRX. Herein, the DRX control information includes the DRX deactivation time information of the UE so that the UE does not transition to an inactive mode until the UE receives the DRX control information from the serving BS, after the UE reports the channel measurement information to the serving BS.

In step 505, the BS determines whether the channel measurement information is received from the UE.

When the channel measurement information is received from the UE, in step 507, the BS determines whether to hand over the UE, based on the channel measurement information received from the UE.

When determining not to hand over the UE, the BS again determines whether the channel measurement information is received from the UE in step 505.

When determining to hand over the UE in step 507, the BS resets the DRX control information of the UE for the handover in step 509. For example, the BS sets the DRX parameters of the UE to shorten the PDCCH monitoring interval of the UE during the DRX deactivation time.

In step 511, the BS transmits the reset DRX control information to the UE, e.g., using an RRC connection reconfiguration message.

In step 513, the BS generates the handover indication information. For example, the BS generates the handover indication information of the UE by negotiating with the target BS of the UE handover.

In step 515, the BS allocates resources to the UE for monitoring the PDCCH, based on the DRX control information of the UE.

In step 517, the BS transmits the handover indication information to the UE over the resources allocated to the UE.

Figure 6:
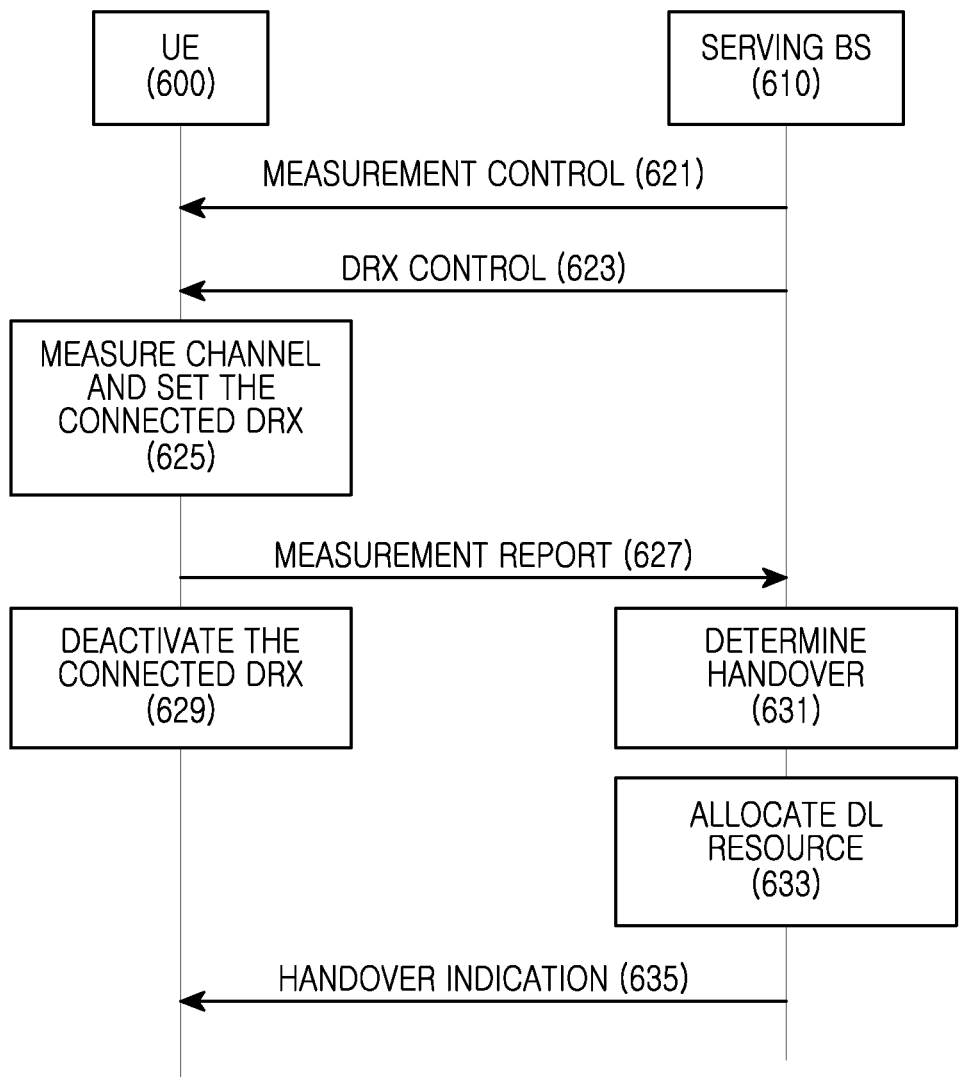
FIG. 6 is a signal flow diagram illustrating a handover method in a wireless communication system according to an embodiment of the present invention.

FIG. 6 is a signal flow diagram illustrating a handover method in a wireless communication system according to an exemplary embodiment of the present invention.

Referring to FIG. 6, a serving BS 610 transmits the measurement control information to a UE 600 in step 621. For example, the serving BS 610 sends the measurement control information to the UE 600 using an RRC connection reconfiguration message.

The serving BS 610 transmits the DRX control information to the UE 600 in step 623. For example, the BS 610 transmits the DRX control information to the UE 600 using the RRC connection reconfiguration message.

In step 625, the UE 600 measures the channel according to the measurement control information provided from the serving BS 610 and operates in connected DRX according to the DRX control information provided from the serving BS 610.

When satisfying the channel report condition of the channel measurement, the UE 600 reports the channel measurement information to the serving BS 610 in step 627.

By considering the channel measurement information, the UE 600 determines whether it can hand over. When the handover is feasible according to the channel measurement information, the UE 600 deactivates the connected DRX in step 629.

In step 631, the serving BS 610 determines whether to hand over the UE 600 based on the channel measurement information provided from the UE 600.

When determining to hand over the UE 600 according to the channel measurement information, the serving BS 610 recognizes that the UE 600 deactivates the connected DRX. Accordingly, the serving BS 610 releases the setting according to the DRX of the UE 600.

Upon determining the handover of the UE 600, in step 633, the serving BS 610 allocates resources to the UE 600 for carrying the handover indication information. Accordingly, the serving BS 610 allocates the resource regardless of the DRX cycle of the UE 600.

In step 635, the serving BS 610 sends the handover indication message using the allocated resources.

Alternatively, the serving BS 610 may transmit the measurement control information and the DRX control information together, e.g., using a single RRC connection reconfiguration message.

Alternatively, the serving BS 610 may first transmit the DRX control information and then transmit the measurement control information.

Figure 7:
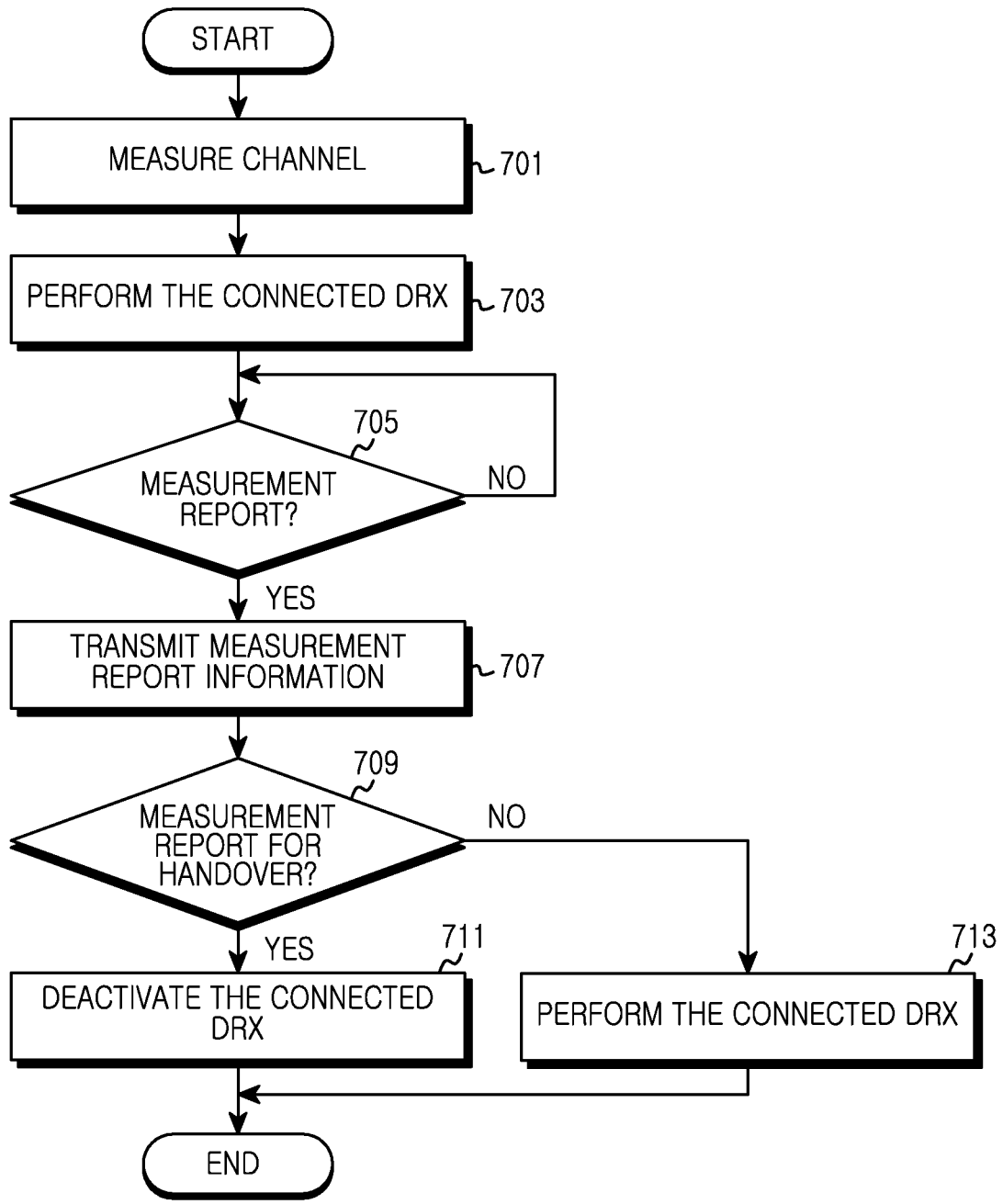
FIG. 7 is a flow chart illustrating operations of a UE for handover in a wireless communication system according to an embodiment of the present invention.

FIG. 7 is a flow chart illustrating operations of a UE for handover in a wireless communication system according to an embodiment of the present invention. In FIG. 7, it is assumed that the serving BS transmits measurement control information in step 621 and then transmits DRX control information in step 623, as illustrated in FIG. 6.

Referring to FIG. 7, in step 701, the UE measures the channel based on the measurement control information received from the serving BS. For example, the UE receives the measurement control information in an RRC connection reconfiguration message.

In step 703, the UE operates in connected DRX according to the DRX control information received from the serving BS. For example, the UE receives the DRX control information in an RRC connection reconfiguration message.

In step 705, the UE determines whether the channel report event occurs. That is, the UE determines whether the channel report condition of the channel measurement is satisfied.

When the channel report event occurs, the UE reports the channel measurement information to the serving BS in step 707.

In step 709, the UE determines whether to hand over, based on the channel measurement information reported to the serving BS.

When the handover is feasible, the UE deactivates connected DRX in step 711. Thereafter, the UE can receive the handover indication information of the BS without delay.

However, when the handover is not feasible, in step 713, the UE operates in connected DRX based on the DRX control information received from the BS.

Figure 8:
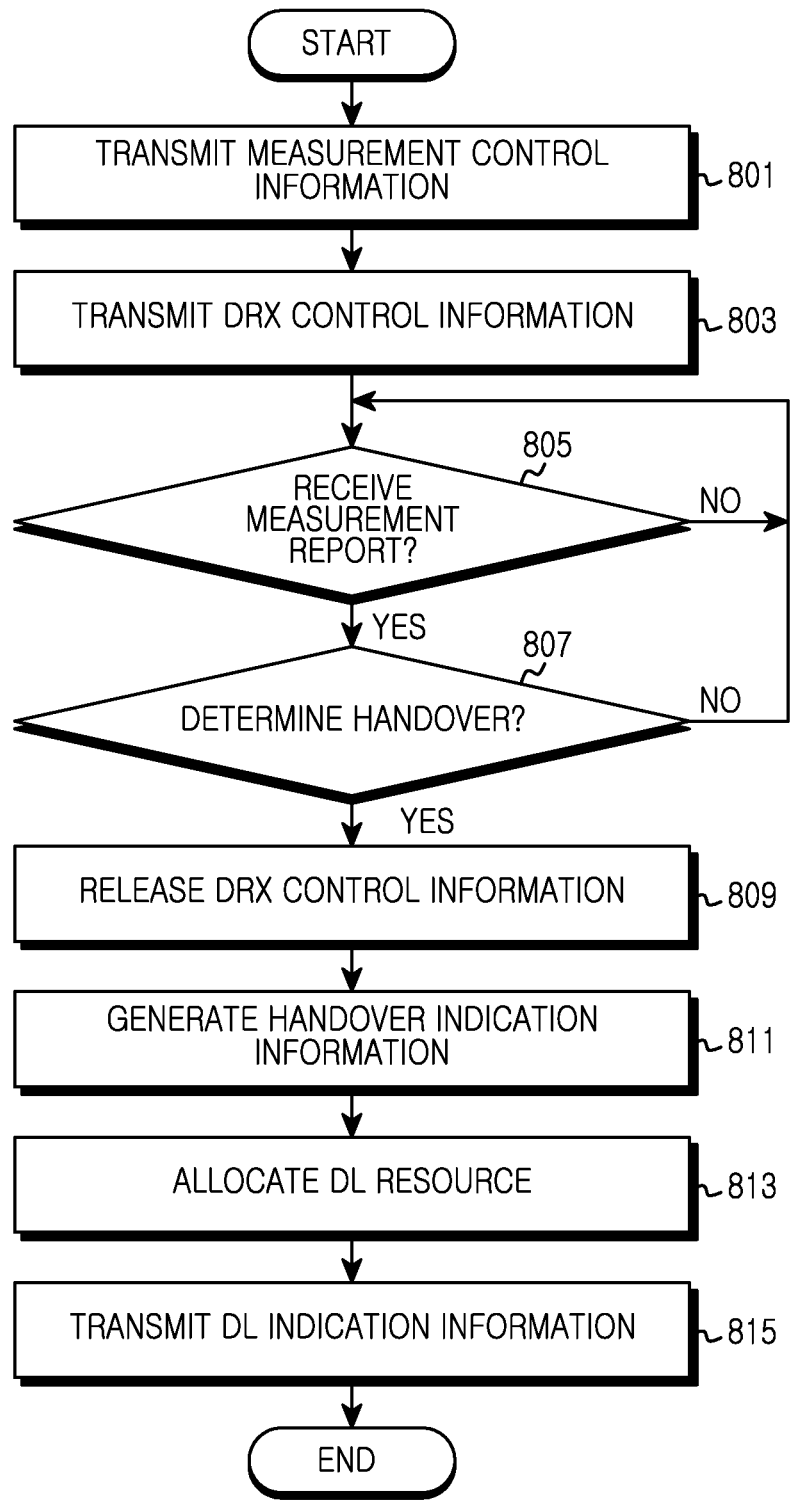
FIG. 8 is a flow chart illustrating operations of a BS for handover in a wireless communication system according to an embodiment of the present invention.

FIG. 8 is a flow chart illustrating operations of a BS for handover in a wireless communication system according to an embodiment of the present invention. In FIG. 8, it is assumed that a serving BS transmits measurement control information in step 621 and then transmits DRX control information in step 623, as illustrated in FIG. 6.

Referring to FIG. 8, in step 801, the BS transmits the measurement control information to the UE so that the UE can measure the channel. For example, the BS transmits the measurement control information to the UE using an RRC connection reconfiguration message.

In step 803, the BS transmits the DRX control information to the UE so that the UE can operate in connected DRX. For example, the BS transmits the DRX control information to the UE using the RRC connection reconfiguration message.

In step 805, the BS determines whether the channel measurement report is received from the UE.

Upon receiving the channel measurement report from the UE, in step 807, the BS determines whether to hand over the UE by considering the channel measurement report of the UE.

When determining not to hand over the UE, the BS determines whether a channel measurement report is received from the UE back in step 805.

When determining to hand over the UE in step 807, the BS releases the setting according to the DRX of the UE in step 809. For example, when handover of the UE is determined, the BS recognizes that the UE deactivates the DRX. Accordingly, the BS releases the setting according to the DRX of the UE.

In step 811, the BS generates the handover indication information. For example, the BS generates the handover indication information by negotiating with the target BS of the UE handover.

In step 813, the BS allocates resources for delivering the handover indication information to the UE. Therefore, because the DRX of the UE is deactivated, the BS allocates the resources regardless of the DRX cycle of the UE.

In step 815, the BS transmits the handover indication information to the UE using the resource allocated to the UE.

Although not illustrated in FIG. 8, when the UE receives the handover indication information from the serving BS, the UE detaches from the serving BS and accesses the target BS.

As described above, by adaptively adjusting a DRX time for a UE handover in a wireless communication system, power consumption of a UE can be reduced according to the DRX time setting. The handover delay of the UE can be reduced by shortening the PDCCH monitoring interval of the UE.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of a Base Station (BS) for controlling a handover of a terminal in a wireless communication system, the method comprising:
   transmitting measurement control information and Discontinuous Reception (DRX) control information to the terminal;
   receiving channel measurement information from the terminal;
   determining whether to perform handover of the terminal based on the channel measurement information received from the terminal;
   resetting the DRX control information of the terminal, in response to a determination to perform handover of the terminal;
   transmitting the reset DRX control information to the terminal; and
   transmitting handover indication information to the terminal,
   wherein the handover indication information is transmitted to the terminal while the terminal operates according to the connected DRX based on the received reset DRX control information from the BS;
   wherein transmitting the measurement control information and the DRX control information comprises:
   transmitting the measurement control information and the DRX control information to the terminal using at least one Radio Resource Control (RRC) connection reconfiguration message;
   wherein the DRX control information includes DRX deactivation time information, which is set such that the terminal does not transition to an inactive mode, until the terminal receives the DRX control information from the serving base station, after the terminal reports the channel measurement information to the serving base station.

2. The method of claim 1, wherein the reset DRX control information includes at least one of DRX cycle change information, short DRX setting information, DRX short cycle time change information, and DRX deactivation time change information.

3. The method of claim 1, wherein transmitting the handover indication information to the terminal comprises:
   allocating a resource to the terminal for monitoring a Physical Downlink Control CHannel (PDCCH) based on the reset DRX control information; and
   transmitting, via the allocated resource, the handover indication information to the terminal.

4. An apparatus of a Base Station (BS) for controlling a handover of the terminal in a wireless communication system, the apparatus comprising:
   means for transmitting measurement control information and Discontinuous Reception (DRX) control information;
   means for receiving channel measurement information from the terminal;
   means for determining whether to perform handover of the terminal based on the channel measurement information received from the terminal;
   means for resetting the DRX control information of the terminal;
   means for transmitting the reset DRX control information to the terminal; and
   means for transmitting handover indication information to the terminal,
   wherein the handover indication information is transmitted to the terminal while the terminal operates according to the connected DRX based on the received reset DRX control information from the BS;
   wherein the means for transmitting the measurement control information and the DRX control information performs:
   transmission of the measurement control information and the DRX control information to the terminal using at least one Radio Resource Control (RRC) connection reconfiguration message;
   wherein the DRX control information comprises DRX deactivation time information, which is set such that the terminal does not transition to an inactive mode until the terminal receives the DRX control information from the serving base station, after the terminal reports the channel measurement information to the serving base station.

5. The apparatus of claim 4, wherein the reset DRX control information comprises at least one of DRX cycle change information,
   short DRX setting information,
   DRX short cycle time change information, and DRX deactivation time change information.

6. The apparatus of claim 4, wherein the means for transmitting the handover indication information further performs:
   allocation of a resource to the terminal for monitoring a Physical Downlink Control CHannel (PDCCH) based on the reset DRX control information of the terminal, and
   transmission, via the allocated resource, of the handover indication information to the terminal.

7. A handover method a terminal in a wireless communication system, the method comprising:
   receiving measurement control information and Discontinuous Reception (DRX) control information from a serving Base Station (BS);
   measuring a channel, based on the measurement control information;
   operating in a connected DRX, based on the DRX control information;
   reporting channel measurement information to the serving BS;
   receiving reset DRX control information from the serving BS;
   resetting the connected DRX based on the reset DRX control information provided from the serving BS and operating the reset connected DRX; and
   receiving handover indication information from the serving BS while the terminal operates according to the reset connected DRX;
   wherein receiving the measurement control information and the DRX control information comprises:
   receiving the measurement control information and the DRX control information from the serving BS using at least one Radio Resource Control (RRC) connection reconfiguration message;
   wherein the DRX control information includes DRX deactivation time information, which is set such that the terminal does not transition to an inactive mode, until the terminal receives the DRX control information from the serving BS, after the terminal reports the channel measurement information to the serving BS.

8. The handover of claim 7, wherein the reset DRX control information includes at least one of DRX cycle change information, short DRX setting information, DRX short cycle time change information, and DRX deactivation time change information.

9. A terminal of a wireless communication system, the terminal comprising:
- means for receiving measurement control information and Discontinuous Reception (DRX) control information from a serving Base Station (BS);
- means for measuring a channel, based on the measurement control information;
- means for operating in a first connected DRX, based on the DRX control information;
- means for reporting channel measurement information to the serving BS;
- means for receiving reset DRX control information from the serving BS;
- means for resetting the connected DRX based on the reset DRX control information provided from the serving BS and operating the reset connected DRX; and
- means for receiving handover indication information from the serving BS while the terminal operates according to the reset connected DRX;

wherein the means for receiving the measurement control information and the DRX control information performs:
receiving the measurement control information and the DRX control information from the serving BS using at least one Radio Resource Control (RRC) connection reconfiguration message;
wherein the DRX control information includes DRX deactivation time information, which is set such that the terminal does not transition to an inactive mode, until the terminal receives the DRX control information from the serving BS, after the terminal reports the channel measurement information to the serving BS.

10. The terminal of claim 9, wherein the reset DRX control information includes at least one of DRX cycle change information, short DRX setting information, DRX short cycle time change information, and DRX deactivation time change information.

* * * * *